United States Patent [19]
MacPherson, Jr. et al.

[11] Patent Number: 5,223,154
[45] Date of Patent: Jun. 29, 1993

[54] SYSTEM FOR FILTERING LIQUIDS IN A CATCH BASIN USING FILTERS IN SERIES AND OVERFLOW CHANNELS

[75] Inventors: John W. MacPherson, Jr., Snohomish; Brian L. O'Neal, Bothell, both of Wash.

[73] Assignee: Emcon Northwest, Inc., Bothell, Wash.

[21] Appl. No.: 786,779

[22] Filed: Nov. 1, 1991

[51] Int. Cl.⁵ .................. E03F 1/00; B01D 29/56
[52] U.S. Cl. .................. 210/790; 210/155; 210/163; 210/248; 210/336; 210/451; 210/489; 210/801; 404/2; 405/36
[58] Field of Search .................. 210/155, 163, 164, 170, 210/248, 314, 335, 339, 433.1, 435, 451, 489, 490, 498, 504, 508, 510.1, 165, 336, 506, 790, 801; 404/34; 405/36

[56] References Cited

U.S. PATENT DOCUMENTS

| | | | |
|---|---|---|---|
| 4,297,219 | 10/1981 | Kirk et al. | 210/155 |
| 4,419,232 | 12/1983 | Arntyr et al. | 210/164 |
| 4,906,381 | 3/1990 | Barbaro | 210/335 |
| 5,037,541 | 8/1991 | Ruey-Jang et al. | 210/155 |

FOREIGN PATENT DOCUMENTS

| | | | |
|---|---|---|---|
| 1287524 | 1/1969 | Fed. Rep. of Germany | 210/248 |
| 169487 | 9/1921 | United Kingdom | 210/336 |

Primary Examiner—Joseph W. Drodge
Attorney, Agent, or Firm—Schwartz & Weinrieb

[57] ABSTRACT

Apparatus, methods and media for filtering liquids are especially suited for insertion into an existing storm water catch basin. The filtration that occurs reduces concentration of storm water runoff pollutants including heavy metals, suspended solids, particles and oil and grease. While being able to handle the high flow rates of storm water runoff, the filters also remove small particles and oil and grease the filters are arranged such that overflow from uppermost filters, as they become clogged, is directed by overflow weirs to change direction to allow filtration by lower filters. Storm water surges during peak intensity are permitted to over flow directly into a catch basin to prevent ponding. The invention can also be used above ground to treat pumped liquid from industrial and environmental sources.

33 Claims, 5 Drawing Sheets

SYSTEM FOR FILTERING LIQUIDS IN A CATCH BASIN USING FILTERS IN SERIES AND OVERFLOW CHANNELS

BACKGROUND OF THE INVENTION

This invention relates to liquid filtration, and more particularly to the removal of contaminants from environmental water. "Environmental Water" refers to any water effected by human activities destined for discharge into the environment.

Storm water runoff has been identified as the largest source of surface water quality degradation in the United States. Storm water carries the contaminants it picks up into streams, lakes, rivers, oceans and ground water aquifers. To prevent such contaminants from impairing the quality of the water and sediments in such bodies, it is necessary that the storm water runoff contaminants be removed, or at least reduced, and governmental agencies are increasingly requiring treatment to accomplish this goal. Industrial and urban storm water runoff typically contains heavy metals, oils and suspended sediments. The "first flush" or initial runoff generated by a storm usually contains the majority of the contaminants.

When storm water runoff is treated, it is usually collected in above-ground facilities and treated by chemical precipitation, clarification, biological treatment, or filtration. Treatment in such facilities is expensive. It is especially difficult to remove fine particles which are generally less than 500 microns in size without very expensive filtration. It is therefore highly desirable that as many contaminants as possible should be removed from the runoff by preliminary filtration before the runoff gets into a sewer system or body of water. However, the only contaminant removal technique used commonly today is catch basin detention employing filter fabric such as geotextiles. Generally these fabrics tend to catch particles larger than 500-1000 microns, and they rapidly become clogged when the runoff contains oils or fine sediments. However, in most storm water discharges, particles smaller than 500-1000 microns and oil and grease usually are or contain the majority of the contaminants and are therefore the primary sources of water pollution.

OBJECTIVES OF THE INVENTION

Accordingly, it is an object of this invention to provide improved liquid filtration methods and apparatus.

Another object is to provide an inexpensive and effective filtration system and methods that remove contaminants from storm water runoff.

Another object is to provide a filter than can be installed in nearly all existing storm water catch basins.

A further object is to provide a filter apparatus with easy access to catch basin filters for removal and replacement of spent filter media.

A still further object is to effectively remove particulate as small as 15 microns in size, in addition to oil, grease and other materials that adhere to particulate matter.

Another object is to provide filtration apparatus and methods that effectively remove contaminants from the highly concentrated "first flush" of a storm.

Still another object is to prevent a filter from causing backup of storm water or ponding around a catch basin during the peak intensity of a rain storm.

Another object is to provide a temporary catch basin filtration system that can be easily and quickly installed in a catch basin inlet in case of a spill or other emergency.

A still further object is to provide a catch basin filter that can be moved from one catch basin to another as required.

Another object is to provide filtration apparatus and methods that prevent or minimize sediments from collecting in catch basins and storm water collection systems.

A further object is to provide filtration methods and apparatus that can be used to remove contaminants from water pumped from a sump or manhole or process wastewater.

A still further object is to provide durable, relatively simple and low cost liquid filtration apparatus and methods that are portable and easily installed and maintained by low skilled labor, and which do not possess defects found in similar prior art filters and methods.

Other objects and advantages of the invention will be apparent from the specification and claims, and the scope of this invention will be set forth in the claims.

DESCRIPTION OF THE DRAWING

FIG. 3 is a partially broken away cross sectional view taken along the line 3—3 in FIG. 1.

DESCRIPTION OF THE INVENTION

Figure 1:
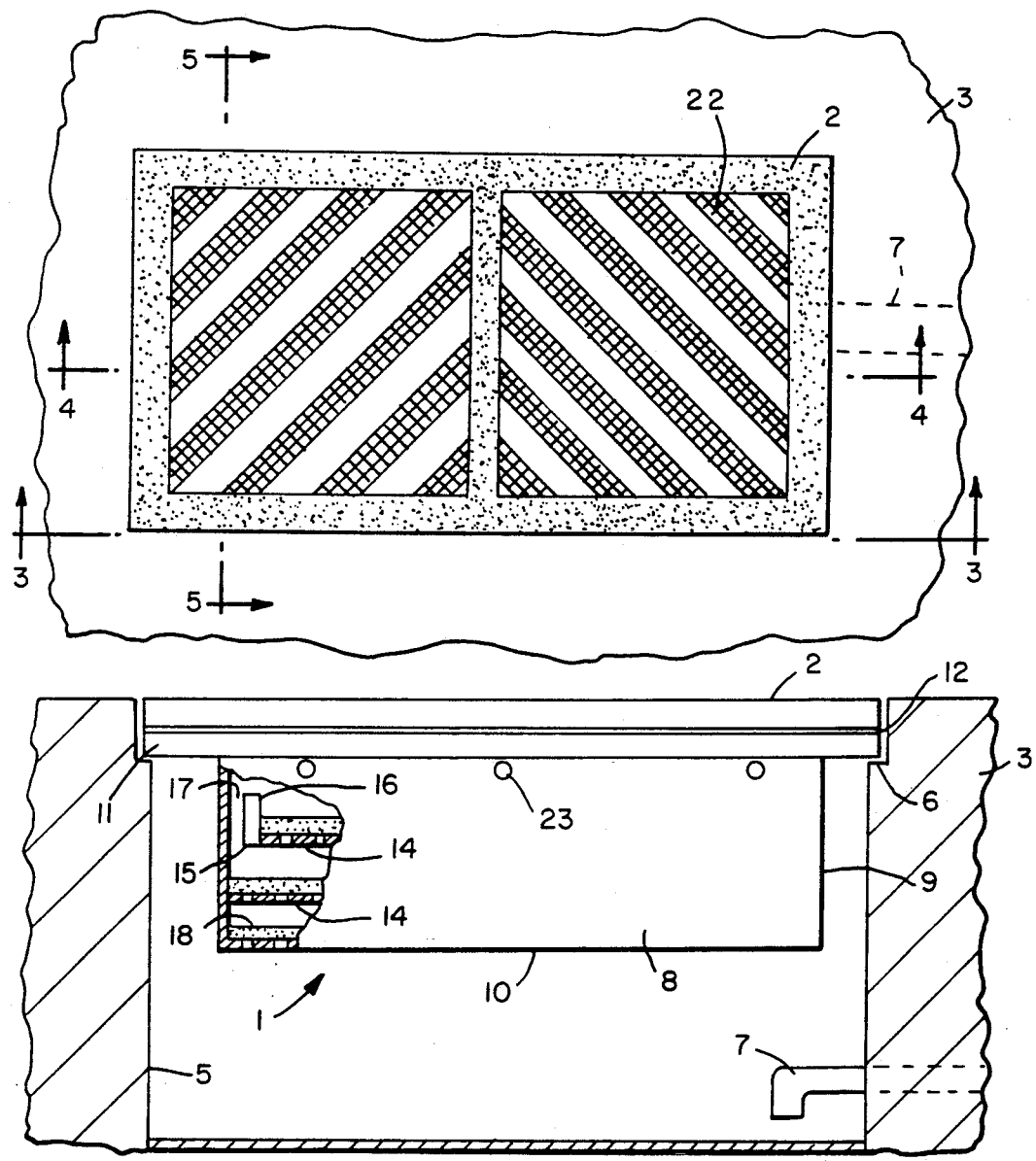
FIG. 1 is a schematic partially broken away top plan view of an embodiment of the invention.
Figure 2:
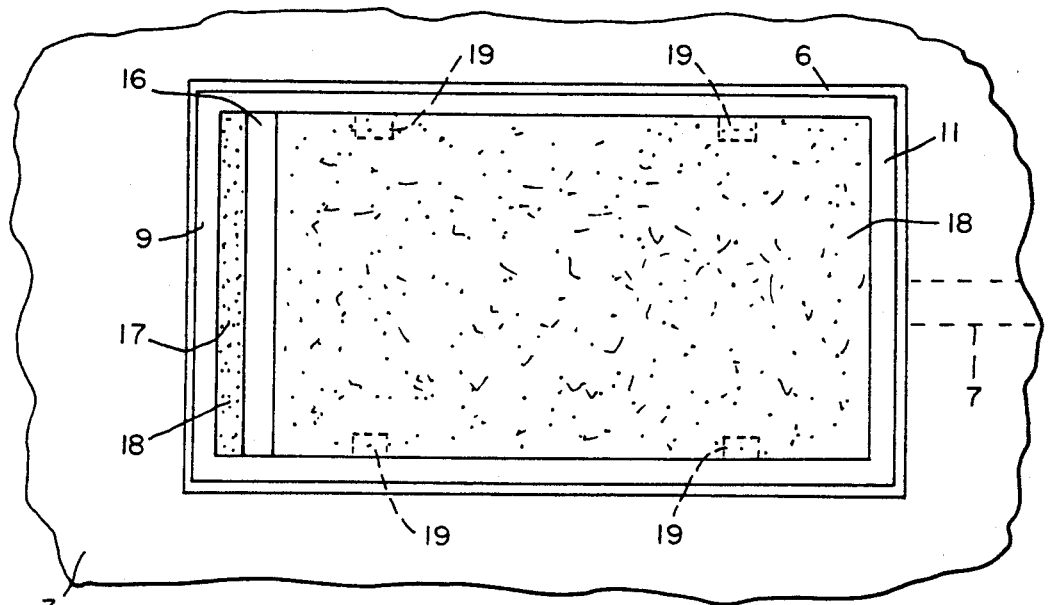
FIG. 2 is a view corresponding to FIG. 1 with the grate removed from the catch basin and screen removed from the filter.

The drawing shows liquid filtration apparatus 1 for removing contaminants from storm water runoff that flows through a removable rectangular grate 2 of a conventional catch basin 3 that has an inner peripheral wall 5, a rectangular ledge 6 around its open top for receiving grate 2. Water leaves basin 3 through a drain pipe 7. Filter apparatus 1 employs an open-topped unitary housing 8 that is dimensioned to fit inside of wall 5. Housing 8 has a rectangular side wall 9, a perforated base plate 10, and a peripheral support flange 11 that extends horizontally outwardly away from side wall 9 at the open top. Flange 11 rests on ledge 6 underneath grate 2 and is the only means for supporting filter 1 in the catch basin. Preferably, a silicone based gasket 12 is placed between flange 11 and ledge 6 to prevent storm water from leaking around the filter. The open top of housing 8 provides an inlet through which all liquid passing through grate 2 enters filter 1, and base plate 10 provides an outlet for directing all of the filtered liquid into catch basin 3.

Housing 8 encloses at least one, but preferably two or more, vertically spaced removable filter trays 13 dimensioned to fit against the inside surface of wall 9. Each tray has a perforated bottom 14 and a terminal end 15 that is spaced from one side or segment of wall 9. A vertical overflow weir 16 extends across each tray at its terminal end. Each weir 16 is spaced horizontally from the segment of wall 9 opposite its terminal end, and each weir and its closest or associated wall segment define between them a part of a vertical flow channel 17 for liquid flowing through filter 1. Each weir 16 extends vertically above a filter media 18 that covers the bottom of its tray and also covers base plate 10. Each tray 12 overlaps and is coextensive with the tray or trays closest to it, except for where the end 15 of each tray is spaced from side wall 9, and the tray closest to base plate 10 overlaps and is coextensive with the base plate in the same way. A plurality of vertical support structures such as legs 19 extend downwardly from the bottom of each tray for holding the tray above the next lower tray or above base plate 10. The legs on each tray rest on the next lower tray or on base plate 10.

Figure 4:
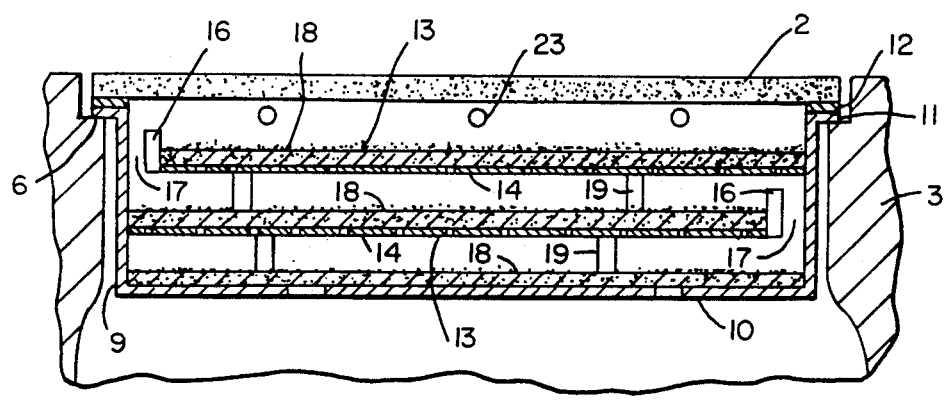
FIG. 4 is a cross sectional view taken along the line 4—4 in FIG. 1.
Figure 5:
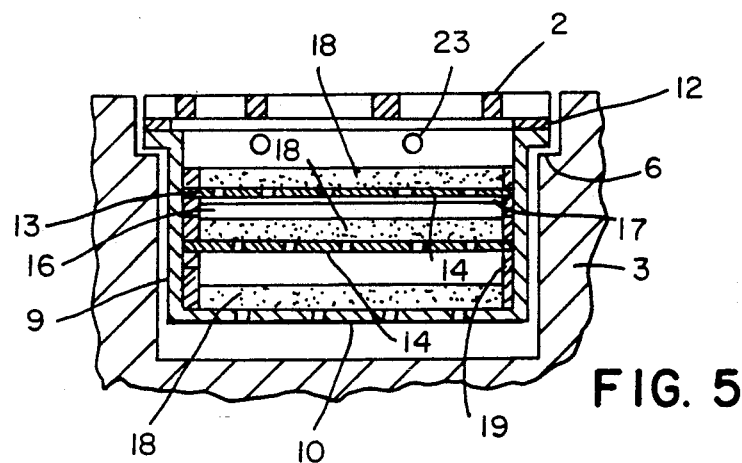
FIG. 5 is a cross sectional view taken along the line 5—5 in FIG. 1.

As shown in FIG. 4, the part of flow channel 17 defined by the weir 16 of each tray is at an end of housing 10 that is opposite to the end at which is located the part of flow channel 17 defined by the weir on an adjacent tray or trays. Placing the weirs 16 on alternate trays at opposite ends of the housing makes it necessary for the liquid flowing over any weir to change direction and flow in the opposite direction before it can flow over the weir of the filter tray next below it. This criss crossing flow pattern through channel 17 ensures that the liquid flowing through filter 1 receives maximum exposure to the filter media 18.

Figure 6:
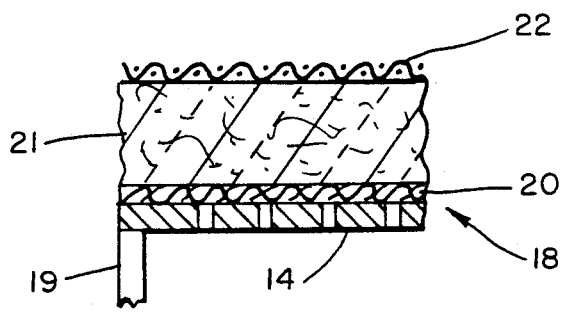
FIG. 6 is an enlarged cross sectional partial view of the filter media on the uppermost tray.

The filter media 18 may be any material or combination of materials that will remove the contaminates specified for any specific filter installation. For example, activated carbon, ion exchange resin, cloth, sand and other particulate materials may be used. When storm water runoff is to be filtered by suspending apparatus 1 in a catch basin, the filter media 18 shown in FIG. 6 has the ability to capture large amounts of the metals, oil and grease, and particles larger than 15–30 microns that contaminate such runoff. A drainage net 20 is first placed on perforated bottom 14. The net 20 is preferably high density polyethylene netting having a mesh size in the range of ⅛ to ½ inches, and a thickness in the range of 1/16 to ⅜ inches. A fiber glass blanket 21 covers net 20. The blanket 21 should be made from glass fibers having a length in the range of 1 to 2 inches, and a diameter in the range of approximately 10 microns. The fibers are preferably bonded with a phenol-formaldehyde urea condensate to form blanket 21 which exhibits a density in the range of 0.5 to 1.0 pounds per cubic foot, and preferably 0.6 pounds per cubic foot. The blanket 21 should be from about 1 to 6 inches thick, and preferably 2 to 3 inches thick. Suitable fiberglass mats that appear to be useful in the practice of this invention include those blankets made in accordance with the teachings of U.S. Pat. Nos. 3,616,181, 4,244,485 and 4,609,628. According to a preferred embodiment, blankets 21 contain between about 85 to 96% fiberglass and from about 4 to 15% of cured phenol-formaldehyde-urea binder solids.

Although a wetting agent is not required, such an agent may be useful in filtering some liquids. The top or upstream surface of blanket 21 may be sprayed with a wetting agent which is preferably low foaming, low toxicity surfactant, examples of which are well known in the art. A preferred wetting agent formulation includes propylene glycol and alpha hydroxy omega-hydroxy-poly (oxyethylene)/poly (oxyethylene) block copolymer having a minimum average molecular weight of 1900 and is sold under the name "Dri-It" by DeBois Chemicals, a division of Chemed Corporation. Approximately ten milliliters of a one percent solution of this surfactant may be applied to each square foot of the top or upstream surface of blanket 21. It is understood that numerous wetting agents may be employed in the present invention. The amount of wetting agent employed to treat blanket 21 is an amount effective to enhance the wetting of the blanket and penetration of environmental water passing therethrough. The media 18 may be used to cover each of the trays 13 and base plate 10. A coarse screen or pre-filter 22 may be placed on or above the filter media 18 on the uppermost tray 13. Screen 22 can increase the life of the filter media 18 by removing debris and large particles such as sticks and rocks.

The following examples illustrate the ability of a filter media of the type described above with reference to FIG. 6 for the removal of metals, oil, grease, and suspended solids from water that flows into a catch basin:

EXAMPLE I

Liquified catch basin sediment was collected from three different catch basins at an industrial site. A 40-gallon plastic tank, equipped with a ¾ inch diameter overflow discharge pipe, was filled with clean water. Clean water was continuously added to the tank at a rate of 1.3 gallons per minute (GPM). As water reached the level of the overflow, it discharged to the center of a filter unit. The filter media in this unit was 12 inches in height and had a diameter of 16 inches.

Every 15 minutes approximately two liters of the liquified sediment was added to the tank and the tank was continuously agitated by means of a stirring paddle. This dilute sediment/water mixture simulated contaminated storm water and was conveyed to the filter unit through the ¾ inch overflow discharge pipe. The flowrate of the simulated contaminated storm water to the filter continued at 1.3 GPM for four hours. A total of 312 gallons of contaminated water was processed by the filter.

Samples for total copper, lead, zinc, and oil and grease were taken at one hour and three hours after the start of the test. "Before treatment" samples were taken from the 40-gallon tank and "after treatment" samples taken from the output of the filter unit. These samples were analyzed and the results are tabulated below.

Visual observations indicated that the input to the filter unit was dark colored and oily while the output from the filter was clear, nearly colorles, and contained no visible oil.

| SAMPLE | CATCH BASIN FILTER TEST I | | | |
| --- | --- | --- | --- | --- |
|  | COPPER (mg/l) | LEAD (mg/l) | ZINC (mg/l) | OIL AND GREASE (mg/l) |
| 1A before filter | 21.0 | 13.0 | 3.6 | not tested |
| 1B after filter | 1.3 | 0.58 | 0.36 | not tested |
| 2A before filter | 11.0 | 5.0 | 3.4 | 30 |
| 2B after filter | 1.4 | 0.67 | 0.43 | 2.2 |
| Avg. % Reduction | 90.6% | 91.1% | 88.7% | 92.7% |

The above results were obtained at a flow rate of 1.3 GPM per square foot of filter surface area. At the end of the four hour test period the filter was still successfully filtering water at this flow rate.

EXAMPLE II

Approximately 2 gallons of the same sediment used in Example I were placed in a 55 gallon plastic mix tank, and clean water was added to bring the total volume in the tank to 50 gallons. A 1-horsepower impeller-type mixer was used to mix the water and sediment. While mixing, liquid was pumped from the tank and discharged to the top of a catch basin filter as described above. The sediment/water mixture simulated contaminated storm water and was conveyed to the filter unit by means of an electric bellows-type pump at a flow rate of approximately 0.6 gallons per minute. The flowrate of the simulated contaminated storm water to the filter continued for about 1.5 hours, resulting in filtration of about 50 gallons. Samples for total and dissolved copper, lead, zinc, oil and grease, and total suspended solids (TSS) were taken at approximately one hour after the start of the test. "Before treatment" samples were taken from the discharge from the 55-gallon tank and "after treatment" samples taken from the output of the filter unit. These samples were analyzed and the results are tabulated below.

Visual observations indicated that the input to the filter unit was dark colored and oily while the output from the filter was clear, nearly colorless, and contained no visible oil.

| SAMPLE | CATCH BASIN FILTER TEST II | | | | |
| --- | --- | --- | --- | --- | --- |
|  | COPPER total (mg/l) | LEAD total (mg/l) | ZINC total (mg/l) | OIL GREASE (mg/l) | TSS** (mg/l) |
| CBF-B before filter | 54.0 | 4.2 | 13 | 56.0 | 710 |
| CBF-A after filter | 1.3 | 1.2 | 0.39 | <1.0 | 9.3 |
| percent reduction | 97.6 | 71.4 | 97.0 | 98.2 | 98.7 |

**Total suspended solids

EXAMPLE III

Approximately 50 pounds of construction site dirt was collected from the street surfaces boardering a large construction project. Approximately 0.5 pounds of the construction dirt was placed in a 55 gallon plastic mix tank. Clean water was added to attain a total volume of 50 gallons. A 1-horsepower impeller-type mixer was used to mix the water and dirt. Mixing continued, clean water was added continuously to the tank, and the dirt-water mixture was pumped from the tank and discharged to the top of a catch basin filter constructed as described herein. The mixture was meant to simulate contaminated storm water from a construction site and was conveyed to the filter by means of an electric peristaltic pump at a flow rate of approximately 2 gallons per minute. The flow of the mixture to the filter continued for approximately 3.5 hours, resulting in filtration of about 420 gallons. Samples for total and dissolved copper, lead, zinc, oil and grease, and total suspended solids (TSS) were taken at approximately one half hour after the start of the test. "Before treatment" samples were taken from the discharge from the 55-gallon tank and "after treatment" samples taken from the output of the filter. One additional sample after treatment was taken for particle size analysis.

Visual observations indicated that the input to the catch basin filter was dark colored and slightly oily while the output from the filter was clear, nearly colorless, and contained no visible oil.

| SAMPLE | CATCH BASIN FILTER TEST III | | | |
| --- | --- | --- | --- | --- |
|  | COPPER total/diss* (mg/l) | LEAD total/diss* (mg/l) | ZINC total diss.* (mg/l) | TSS* (mg/l) |
| CBF-B1 before filter | 21.0/0.10 | 1.60/0.11 | 4.3/0.085 | 990 |
| CBF-A1 after filter | 0.88/0.10 | 0.58/0.11 | 0.230/0.085 | 16 |
| CBF/B2 | 2.9 | 0.750 | 0.730 | 500 |
| CBF/A2 | 0.23 | 0.088 | 0.083 | 15 |
| CBF/B3 | 0.590 | 0.640 | 0.360 | 1200 |
| CBF-A3 | 0.084 | 0.085 | 0.084 | 120 |
| Ave. % Reduction (total) | 91.2 | 79.6 | 86.7 | 95.1 |

*The first value in this column represents total metals. The second value is for dissolved metals.
**Total suspended solids For sample CBF-A1 particle size distribution analysis indicated that after filtration, 96 percent of the particles were in the size range of 0–15 microns, 3.8 percent in the range of 15–30 microns and the remainder of the particles in the 30–100 micron range. Thus 99.8 percent of the total suspended solid remaining after filtration were less than 30 microns in size.

The above examples show that the filter structure and filter media disclosed herein can effectively remove contaminants from environmental water. The results reported show that this filter can reduce the concentration of contaminants in a storm water runoff including the "first flush".

Essentially all liquid flowing through grate 2 will flow on to and through the uppermost filter tray 13. The only incoming liquid that will miss the uppermost tray will be the liquid that flows directly through grate 2 into the portion of channel 17 at the end 15 of this try. Since the weirs 16 on the ends of the trays are staggered at opposite ends of housing 9, the small amount of liquid that misses the uppermost tray through its channel 17 will flow directly on to and through the intermediate tray that is next below the uppermost tray. Essentially all liquid that has been filtered by passage through the uppermost tray 13 will flow directly on to and through the next lower filter tray 13, providing additional filtration. The only filtered liquid from the uppermost tray 13 that will miss the next lower tray will be the filtered liquid that passes through the portion of channel 17 at the end 15 of the next lower tray, and this filtered liquid will fall on to and through the next lower tray, as explained above, or on to the filter media 18 on base plate 10. Eventually all of the filtered liquid must pass through and be filtered again by the filter media on base plate 10 which can be regarded as a second or final filter.

The filter media 18 on the uppermost or first filter tray 13 has an initial maximum liquid flow through rate. As substances from the liquid being filtered collect on the filter media, the flow through rate decreases to a lesser flow through rate. During use, the maximum liquid flow through rate at any given time is determined by the amount of substance deposited on the first filter by the liquid that has already flowed through the first filter. The liquid flow through rate for any intermediate filter and for the media on base plate 10 would be decreased from a maximum to a lesser flow through rate in the same way. Thus, the flow through rate for the first filter may decrease to a level where the volume of liquid entering filter 1 exceeds the volume of liquid the first filter is capable of filtering at its then existing flow through rate. This may also occur because a storm surge or spill greatly increases the volume of liquid flowing into filter 1. The excess volume of liquid that does not pass through the uppermost filter tray will bypass that filter by flowing over its weir 16 and into channel 17. This excess volume will then be filtered by passage through the filter media 18 on one or more intermediate filter trays 13 or through the media 18 on base plate 10, if there are no intermediate filters. The same bypassing of a filter tray occurs whenever the volume of liquid flowing on to a tray exceeds its then existing flow through rate. However, the filter 1 maximizes the exposure of the liquid to filtration because staggering alternate weirs 16 at opposite ends of housing 8 makes it necessary for any excess flow to reverse its direction and flow all the way across the next lower filter tray before it can bypass that tray by flowing over its weir.

The liquid passing through grate 2 will be filtered by one or more layers of the filter media 18 before it enters catch basin 3 because all liquid flowing into filter 1 exists through the filter media on base plate 10. The only exception occurs when an extreme storm or spill surge exceeds the volume of liquid that can pass through base plate 10. The excess surge volume will flow out of housing 8 through emergency openings such as holes 23 located at the top of the housing just beneath flange 11. The holes 23 must be above the top of weir 16 on the uppermost tray 13 to prevent liquid from bypassing the weir.

Figure 7:
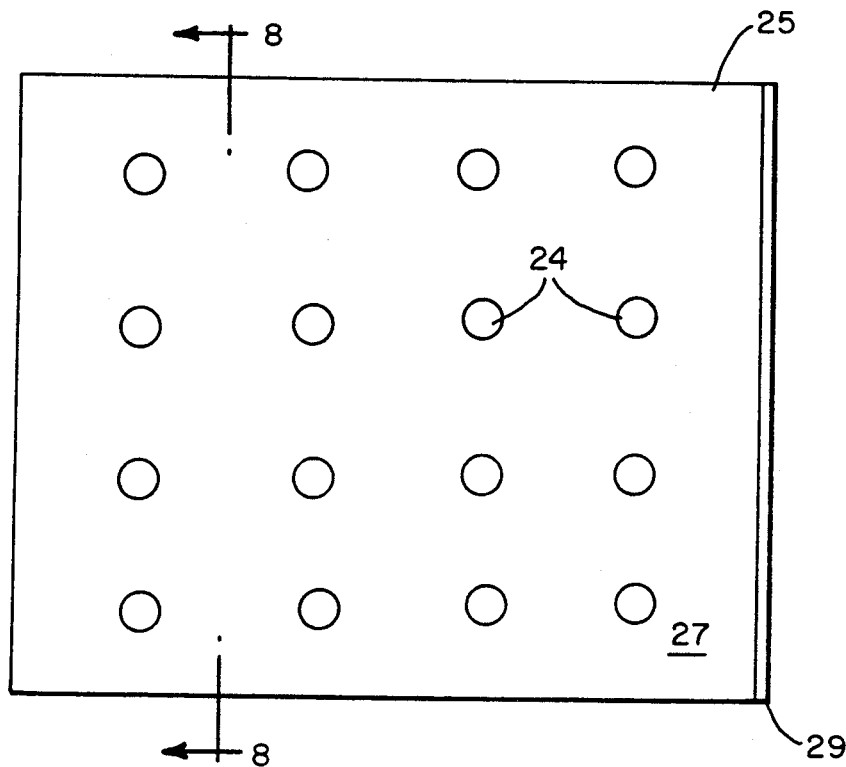
FIG. 7 is a plan view of another embodiment of a filter tray in accord with this invention.
Figure 9:
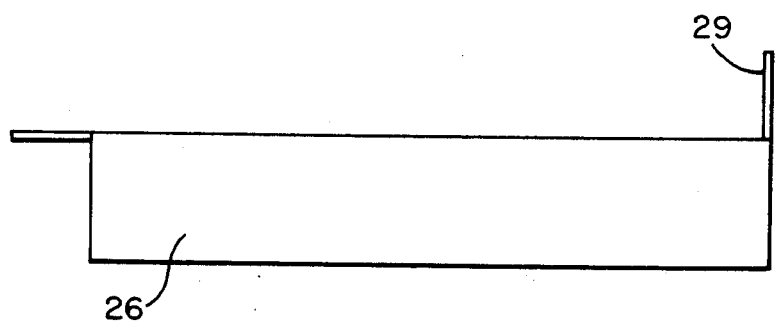
FIG. 9 is a side view of the filter tray shown in FIG. 7.
Figure 8:
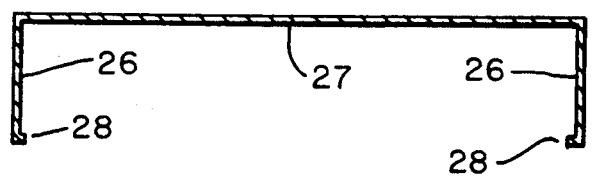
FIG. 8 is a cross sectional view taken along the line 8—8 in FIG. 7.

FIGS. 7-9 show another embodiment of a filter tray 25 in which the vertical support structures are side panels 26 that extend downwardly from bottom 27 for most of the length of the tray. Bottom 27 is perforated by a plurality of uniformly spaced holes 24. The terminal ends 28 of the support panels may be bent inwardly toward each other. Tray 25 may be a unitary structure that can be fabricated from a single sheet of metal. Each tray 25 has a vertical overflow weir 29, and these trays function in filter 1 in the same manner as described with reference to trays 13.

Figure 10:
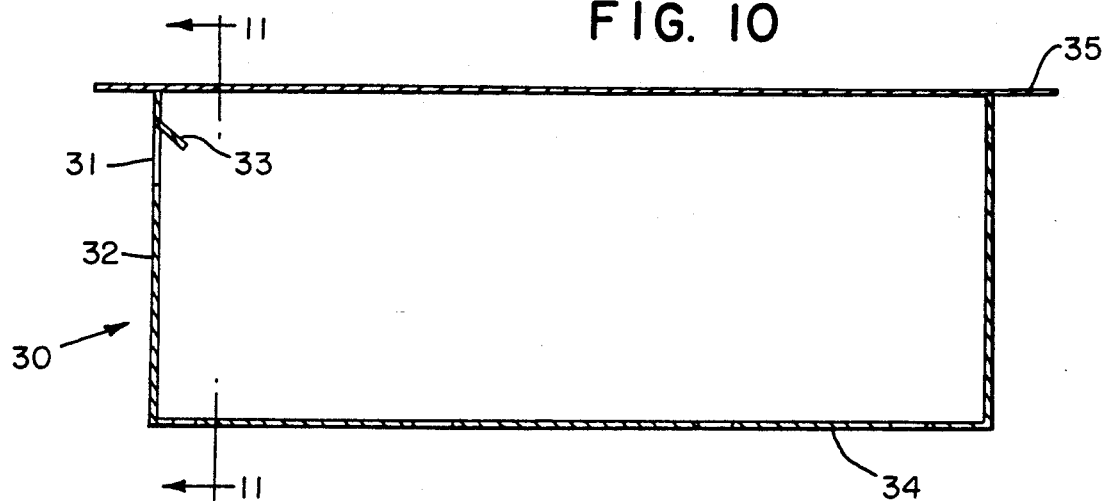
FIG. 10 is a cross sectional view of another embodiment of a filter housing in accord with this invention.
Figure 11:
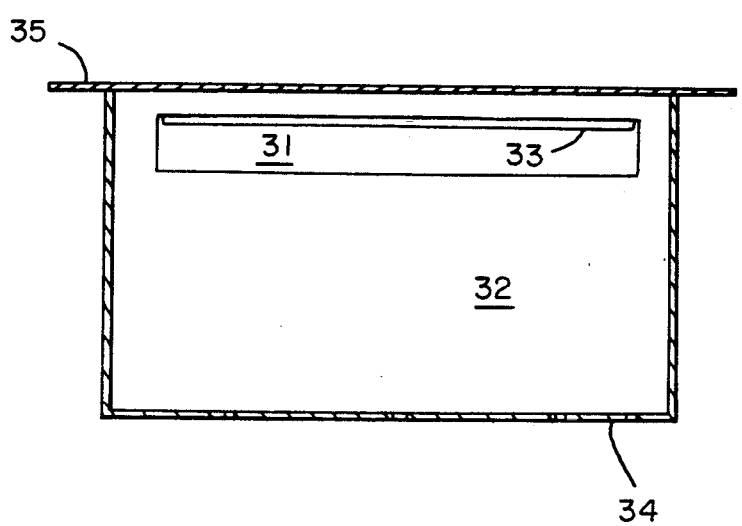
FIG. 11 is a cross sectional view taken along the line 11—11 in FIG. 10.
Figure 12:
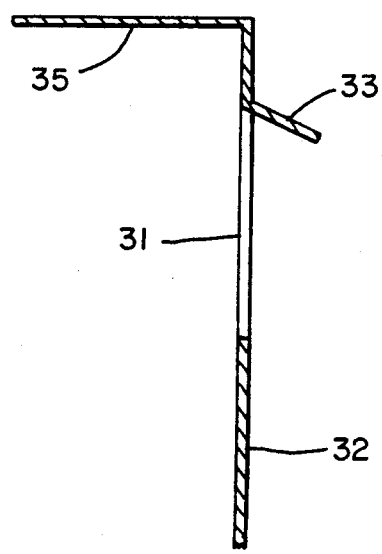
FIG. 12 is an enlarged fragmentary cross sectional view of the embodiment of FIGS. 10-11.

FIGS. 10-12 show the preferred embodiment of a filter housing 30 that is identical to housing 8, except that the overflow holes 23 have been replaced by an elongated horizontal slot 31 that extends for most of the length of the side wall 21 on which the slot is located. A flap 33 integral with the side where slot 31 is located extends into housing 30 above the slot. The flap 33 serves to prevent liquid from escaping through the slot except when the liquid from a surge is overflowing as described previously. Housing 30 has a perforated base plate 34 and a peripheral support flange 35, and the housing 30 functions in the same manner as housing 8.

Figure 13:
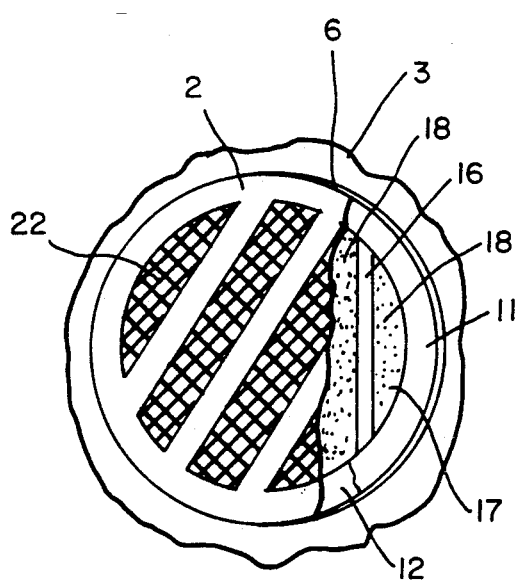
FIG. 13 is a schematic, partially broken away top plan view of another embodiment of the invention.

FIG. 13 illustrates another embodiment of the invention that is identical in all respects to the embodiment of FIGS. 1-12 except that the catch basin 3, grate 2, and the components of the filter 1 are circular instead of being rectangular. Accordingly, the same reference numerals have been used to identify corresponding parts.

Figure 14:
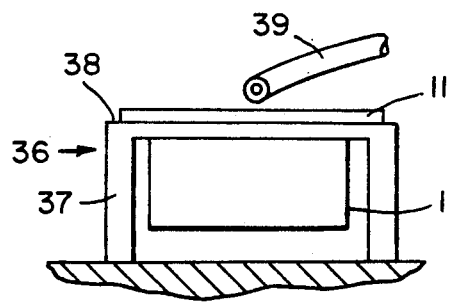
FIG. 14 is a schematic elevational view of another embodiment of the invention.

FIG. 14 illustrates another embodiment in which the filter 1 is identical to the embodiments of FIGS. 1-13. However, instead of being supported in a catch basin, the filter 1 is supported above the ground on a stand 36 having legs 37 and an upper rim 38 upon which the flange 11 rests. The liquid being filtered will flow into filter 1 via a conduit 39 through which it is pumped. The source from which such flowing liquid is pumped may be an industrial facility such as a shipyard, auto body shop, car wash, machine shop, marina, vehicle repair or maintenance shop, metal fabrication or recycling or other manufacturing facility, paint shop, oil refinery, pulp mill or airport. The filter 1 is also usable for drilling muds or drilling fluids associated with the drilling of monitoring wells, and any other type of well utilizing water in the drilling process or producing water as a consequence of drilling activity.

This invention also includes methods of filtering liquids. A first or uppermost filter tray 13 or 25 and a second or lowermost filter such as the media 18 on base plate 10 are suspended in a catch basin. Another filter tray 13 or 25 may be an intermediate filter located between the first and second filters. Since the flow through rate of a filter decreases as filtered residue deposits on the filter, liquid is passed through the first filter until the liquid flow through rate of that filter is exceeded by the incoming liquid flow volume. Then any excess flow volume that exceeds the then existing liquid flow through rate of the first filter is bypassed to the second filter. At the same time, all liquid filtered by the first filter also passes through and is filtered by the second filter. The bypassing may be accomplished by flowing the liquid over a weir 16 or 29 into a channel 17 at the end of the first filter. Requiring the liquid to change directions before it can flow over any additional weir 16 or 29, such as on the intermediate filter 13 or 25, prevents the liquid from bypassing any intermediate filter that has a then existing flow through rate capable of filtering the excess volume that is bypassing the first filter. The liquid can be made to change directions by locating a weir at an end 15 of an intermediate filter 13 or 25 beneath an upper filter 13 or 25 and at an end of housing 8 or 30 opposite to the end where the weir 16 or 29 on the upper filter is located.

Replacement of spent filter media 18 is easily accomplished. Removal of the grate 2 permits access to filter 1, and the media 18 on the uppermost tray 13 or 25 should be rolled up into a cylinder with the bottom of the media exposed and the contaminated top surface on the inside of the roll. The media 18 should be squeezed over housing 8 while it is being rolled to remove excess water which will fall on to the next lower filter tray 12 or 25 along with some of the contaminants where they will be filtered again. The uppermost tray 13 or 25 can then be lifted out of housing 8 to expose the next tray 1. This procedure of rolling and squeezing the filter media should be repeated for successive filter trays 13 or 25 until a tray 13 or 25 having a clean filter media is found or the filter media covering base plate 10 is found. If the filter media covering base plate 10 is dirty, the filter media should be removed without rolling and squeezing, to avoid releasing contaminants. This filter media should be rolled and squeezed over a container sufficiently large to contain contaminants released from the filter media.

While the invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A liquid filter constructed and arranged for use in a catch basin having an inlet ledge and a grate comprising:
   A. a housing dimensioned to fit inside of said catch basin, said housing having an open top, a side wall, and a perforated base plate, said housing having a peripheral flange extending horizontally outwardly away from said side wall adjacent said open top, said flange resting on said ledge beneath said grate for supporting said filter in said catch basin beneath said grate so that all liquid flowing through said grate flows into said open top, and all liquid flowing through said filter exits through said perforated base plate;
   B. a horizontal filter tray in said housing spaced vertically below said open top, said tray having a perforated bottom and a filter medium in said tray covering its bottom, and said tray having a terminal end that is spaced from a segment of said side wall;
   C. a vertical weir extending across said tray at said terminal end, said weir extending vertically above said filter medium, said weir being spaced horizontally from said segment of said side wall spaced from said terminal end, and said weir defining with said a side wall segment a vertical flow channel for liquid in said filter;
   D. said housing base plate being spaced vertically below said tray, said base plate being overlapped by said tray, and a filter medium covering said baseplate; and
   E. liquid flowing into said filter first passing on to and through the filter medium on said tray, filtered liquid from said tray passing through the filter medium on said base plate and then out of said filter into said catch basin, said liquid continuing to flow through said tray until said filter medium covering said tray becomes clogged, and unfiltered liquid then flowing over said weir and through said flow channel toward said base plate and then through the filter medium on said base plate and out of said filter into said catch basin.

2. The filter defined in claim 1, wherein said flange is the only means for supporting said filter in said catch basin.

3. The filter defined in claim 1, wherein said a filter media comprises:
   A. a high density drainage net covering said tray bottom and a high density drainage net covering said base plate;
   B. a fiber glass blanket covering each of said nets;
   C. a wetting agent applied to the surface of each of said blankets closest to said inlet, said wetting agent comprising a low foaming non-ionic surfactant.

4. The filter defined in claim 3, further comprising a protective screen supported immediately above said filter media on said tray.

5. The filter defined in claim 1, further comprising a plurality of vertical support structures extending downwardly from said bottom for holding said tray above said base plate.

6. The filter defined in claim 5, wherein said support structures comprise a plurality of legs.

7. The filter defined in claim 5, wherein said support structures comprise integral side panels which extend for most of the length of said tray.

8. The filter defined in claim 1, further comprising an intermediate horizontal filter tray located between the first mentioned filter tray and said housing base plate, said intermediate tray overlapping said base plate and being overlapped by said first mentioned tray, said intermediate tray having a perforated bottom, a filter medium on its bottom, an overflow weir extending vertically above said intermediate tray filter medium at one end of said intermediate tray, said weir on said intermediate tray being spaced from another segment of said side wall that is separated from said and segment, and the space between the weir of said intermediate tray and said another side wall segment being part of said vertical flow channel.

9. The filter defined in claim 8, wherein the part of said flow channel defined by the first mentioned weir is at an end of said housing that is opposite to an end at which a flow channel defined by the weir on the intermediate tray is located so that liquid flowing over the first mentioned weir must flow in an opposite direction 10. The filter defined in claim 1 further comprising a plurality of openings in said side wall below said flange but above said weir for permitting surges of said liquid to overflow said filter into said catch basin.

11. The filter defined in claim 1, further comprising an elongated slot in said side wall below said flange but above said weir for permitting surges of said liquid to overflow said filter into said catch basin.

12. The invention defined in claim 11, further comprising a flap integral with said side wall above said slot, said flap extending into said housing for preventing liquid from flowing out of said slot except when surges overflow said housing.

13. A liquid filter adapted for use in a catch basin having a grate comprising:
   A. an integral housing dimensioned to fit inside of said catch basin, said housing including means for mounting said housing in said catch basin below said grate, said housing having a side wall, an open top, and a perforated base plate, said housing being mounted so that all liquid flowing through said grate flows into said open top, and all of said liquid exits from said bottom wall;
   B. a plurality of vertically spaced filter trays in said housing, said trays being stacked so that a portion of each tray vertically overlaps another tray, each tray having a perforated bottom, a plurality of vertical support structures extending downwardly from the bottom of each tray for holding each tray above said housing base plate, and each tray having a terminal end that is spaced from a segment of said side wall;

C. a filter medium in each tray covering its bottom and said mediums covering said bottoms, a high density drainage net covering each tray and said base plate, a fiber glass blanket covering each net, and a wetting agent applied to the surface of said blanket closest to said inlet;

D. a vertical weir extending across each tray at said terminal end, each weir extending vertically above the filter medium on its tray, each weir being spaced horizontally from the segment of said side wall opposite its end portion, and each weir defining with its associated side wall segment a vertical flow channel for liquid in said filter, the flow channel defined by each weir being at an end of said housing that is opposite to an end at which the respective adjacent flow channels are located so that liquid flowing over any weir must flow in an opposite direction before the liquid can flow over another weir;

E. said housing base plate being spaced vertically below the lowermost of said trays, and said base plate being overlapped by said lowermost tray;

F. liquid flowing into said filter first passing on to and through the uppermost of said trays, filtered liquid from the uppermost tray passing through a vertically lower tray and then through said base plate and into said catch basin, said filtered liquid continuing to flow through said uppermost tray until said filter medium in said uppermost tray becomes clogged and unfiltered liquid then flowing filter medium in said uppermost tray becomes clogged and unfiltered liquid then flowing over the weir of said uppermost tray through the flow channel defined by its weir and on to the tray next below said uppermost tray, said liquid then flowing through and being filtered by said filter medium on said next below tray, and filtered liquid from said next below tray flowing on to and through the filter medium on said base plate and then out of said filter into said catch basin; and G. a plurality of openings in said side wall located above said weir on said uppermost tray for permitting surges of said liquid to overflow said filter into said catch basin.

14. The method of filtering liquid flowing through a grate into a catch basin having an inner peripheral wall, comprising the steps of:

A. suspending in said catch basin below said grate an uppermost filter that spans and closes said inner peripheral wall so as to catch essentially all liquid flowing through said grate;

B. terminating an end of said uppermost filter short of a first segment of said peripheral wall so as to define a liquid flow channel between said end and said first segment of said peripheral wall;

C. locating an overflow weir extending vertically above said end of said uppermost filter at one side of said first liquid flow channel;

D. suspending in said catch basin below said uppermost filter an intermediate filter that spans and closes said peripheral wall so as to catch and filter all liquid flowing over said weir of said uppermost filter and essentially all liquid flowing through said uppermost filter;

E. terminating an end of said intermediate filter short of a second segment of said peripheral wall located beneath said uppermost filter so as to define a continuation of said liquid flow channel between said end of said intermediate filter and said second segment of said peripheral wall that is beneath said uppermost filter and offset horizontally from that part of said channel defined by said end of said uppermost filter;

F. locating a weir at said end of said intermediate filter at one side of said continuation of said liquid flow channel beneath said uppermost filter so that liquid flowing over said weir on said uppermost filter must change directions before such liquid can flow over said weir on said intermediate filter; and G. flowing all of the liquid flowing through said grate through a final filter located below said intermediate filter.

15. The method of filtering defined in claim 14, further comprising enclosing said uppermost, intermediate and final filters in a unitary housing having a peripheral flange, and suspending said housing in said catch basin by placing said flange between said grate and an upper surface of said catch basin.

16. Apparatus for filtering a flowing liquid flowing through a catch basin, comprising:

inlet means for directing the liquid entering said apparatus to a first substantially horizontal filter, said apparatus being arranged such that all of the liquid that has been filtered by said first filter passes to at least one second filter, flow means for directing a portion of the flowing liquid moving in a first direction across said first filter and not passing through the first filter over a weir extending vertically above and located substantially at one end of the first filter such that said portion of flowing liquid then flows in a second direction across and through one of said at least one second filter, said one filter being disposed directly beneath and substantially parallel to said first filter, said flowing means, said first filter and said one filter being arranged such that any liquid entering said apparatus that exceeds the volume of liquid that said first filter is capable of filtering over a given time interval that, passes through said one filter or through a subsequent flow means, outlet means for directing from said apparatus all liquid having entered said apparatus, and said apparatus being arranged such that all liquid having entered into said apparatus has passed through at least one of said first or one of said at least one second filter before leaving said apparatus through said outlet means.

17. The apparatus defined in claim 16, wherein said said one of said second filters extends essentially horizontally and said liquid flows essentially vertically from said inlet means to said outlet means under the influence of gravity.

18. The apparatus defined in claim 16, wherein said means for directing said first filter comprises weir means on said first filter over which flows the volume of liquid that exceeds said then existing flow rate.

19. The apparatus defined in claim 16, further comprising a housing enclosing said first and one of said second filters, a peripheral flange extending outwardly away from said housing adjacent said inlet means, and said flange supporting said housing in said flowing liquid.

20. The apparatus defined in claim 19, wherein said housing comprises a side wall, a perforated base plate, and an open top from which said flange extends, said at least one second filter lies on said base plate, and means supporting said first filter above one of said second filter.

21. The apparatus defined in claim 20, wherein said first filter comprises a horizontal tray having a perforated bottom, a filter medium on said bottom, an said weir extending vertically above said filter medium at one end of said tray.

22. The apparatus defined in claim 21, wherein said means supporting said first filter comprises a plurality of vertical support structures extending downwardly from said bottom.

23. The apparatus defined in claim 21, wherein said weir is spaced horizontally from one segment of said side wall and said flow means includes the space separating said weir and side wall segment.

24. The apparatus defined in claim 23, further comprising an intermediate horizontal filter tray located between said first and one of said second filters, said intermediate tray having a perforated bottom and a filter medium on its bottom, an overflow weir extending vertically above said intermediate tray filter medium at one end of said intermediate tray, and said weir on said intermediate tray is spaced from another segment of said side wall that is separated from said one segment of said side wall.

25. The apparatus defined in claim 23, further comprising said housing being dimensioned to fit into a catch basin having an inlet ledge and a grate, said flange overlapping said ledge beneath said grate, and said flange being the sole means supporting said apparatus in said catch basin.

26. The apparatus defined in claim 25, further comprising an opening in said side wall, said opening being located above said weir of said flow means for permitting surges of said liquid to overflow said apparatus into said catch basin.

27. The method of filtering contaminants from a liquid flowing through a catch basin, comprising the steps of:
A. directing said liquid to a first horizontal filter;
B. directing all of the liquid that has been filtered by said first filter to at least one second filter, and
C. directing the portion of the flowing liquid that moves in a first direction across said first filter and which did not pass through said first filter to move in a second direction across and through one of said at least one second filter, by means including an overflow weir extending above and located substantially at one end of the first filter one filter being disposed directly beneath and substantially parallel to said first filter, and
D. thereafter releasing all liquid having been filtered by at least one of said filters, to the environment.

28. The method defined in claim 27, wherein said first filter includes a filter media comprising:
A. a drainage net;
B. a fiber glass blanket covering said net; and
C. a wetting agent applied to the surface of said blanket closest to said inlet means.

29. The apparatus defined in claim 28, further comprising a protective screen supported immediately upstream from said filter media.

30. The method of filtering defined in claim 27, further comprising bypassing said first filter by flowing over said weir on said first filter said volume of liquid that exceeds said volume said first filter is capable of filtering at said then existing flow rate.

31. The method of filtering defined in claim 27, further comprising flowing essentially all of the liquid filtered by said first filter through another filter located between said first and one of said at least one second filter.

32. The method of filtering defined in claim 27, further comprising changing the direction said liquid is flowing, and then flowing said liquid over a weir on another filter located between said first and one of said at least one second filter.

33. The method of filtering defined in claim 27, further comprising flowing said liquid vertically downwardly through said first and one of said at least one second filter under the influence of gravity.

* * * * *